United States Patent
Soles et al.

(10) Patent No.: US 9,186,951 B2
(45) Date of Patent: Nov. 17, 2015

(54) HEIGHT ADJUSTABLE DAMPING DEVICE

(71) Applicant: GM GLOBAL TECHNOLOGY OPERATIONS LLC, Detroit, MI (US)

(72) Inventors: Peter J. Soles, Tecumseh (CA); John K. Dagg, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 154 days.

(21) Appl. No.: 14/105,273

(22) Filed: Dec. 13, 2013

(65) Prior Publication Data

US 2015/0165860 A1 Jun. 18, 2015

(51) Int. Cl.
*B60G 17/08* (2006.01)
*F16F 9/53* (2006.01)
*B60G 13/06* (2006.01)
*B60G 13/12* (2006.01)
*F16F 9/16* (2006.01)
*B60G 17/00* (2006.01)

(52) U.S. Cl.
CPC ............... *B60G 17/08* (2013.01); *B60G 13/06* (2013.01); *B60G 13/12* (2013.01); *F16F 9/165* (2013.01); *F16F 9/535* (2013.01); *B60G 17/00* (2013.01); *B60G 2202/24* (2013.01); *B60G 2500/10* (2013.01); *B60G 2500/30* (2013.01)

(58) Field of Classification Search
CPC ...... B60G 15/12; B60G 17/00; B60G 17/005; B60G 17/015; B60G 17/08; B60G 13/06; B60G 13/12; B60G 2400/5182; B60G 2500/10; B60G 2500/30; F16F 9/062; F16F 9/063; F16F 9/16; F16F 9/165; F16F 9/53; F16F 9/535; F16F 13/30; F16F 13/305; B60S 9/10; B60S 9/12

USPC ............... 280/5.514, 5.507, 6.157, 6.158
See application file for complete search history.

(56) References Cited

U.S. PATENT DOCUMENTS

| | | | | |
|---|---|---|---|---|
| 3,059,915 A * | 10/1962 | Kemelhor | ............... | 267/126 |
| 3,430,977 A * | 3/1969 | Riehl | ............... | 267/64.16 |
| 3,499,505 A * | 3/1970 | De Carbon | ............... | 184/6 |
| 3,653,682 A * | 4/1972 | Palmer et al. | ............... | 280/124.128 |
| 5,277,281 A * | 1/1994 | Carlson et al. | ............... | 188/267 |
| 5,284,330 A * | 2/1994 | Carlson et al. | ............... | 267/140.14 |
| 6,095,486 A * | 8/2000 | Ivers et al. | ............... | 251/129.01 |
| 6,360,856 B1 * | 3/2002 | Koh | ............... | 188/267.1 |
| 6,382,369 B1 * | 5/2002 | Lisenker | ............... | 188/267.2 |
| 8,844,944 B1 * | 9/2014 | Murakami | ............... | 280/5.514 |
| 2001/0032749 A1 * | 10/2001 | Thomas et al. | ............... | 180/402 |
| 2002/0130002 A1 * | 9/2002 | Hopkins et al. | ............... | 188/267.2 |

(Continued)

*Primary Examiner* — Ruth Ilan
*Assistant Examiner* — Barry Gooden, Jr.
(74) *Attorney, Agent, or Firm* — Quinn Law Group, PLLC (57) ABSTRACT

A damping device includes a housing defining a pressure chamber, containing a magnetorheological fluid. A rod is slideably coupled to the housing to adjust a length of the housing. A piston is attached to the rod and disposed within the pressure chamber. The piston is immersed within the magnetorheological fluid, and separates the pressure chamber into a first half and a second half. An electromagnet is disposed in magnetic contact with the magnetorheological fluid, and is operable to apply a magnetic field to the magnetorheological fluid to increase viscosity of the magnetorheological fluid to prevent movement of the rod relative to the housing. The magnetorheological fluid is free to flow through a fluid port in the piston, between a first half and a second half of the pressure chamber, in the absence of the magnetic field from the magnetic source to allow adjustment of the length.

13 Claims, 4 Drawing Sheets

(56) References Cited

U.S. PATENT DOCUMENTS

| | | | |
|---|---|---|---|
| 2003/0038468 A1* | 2/2003 | Chernoff et al. | 280/781 |
| 2003/0094319 A1* | 5/2003 | Chernoff et al. | 180/54.1 |
| 2005/0016802 A1* | 1/2005 | Akami et al. | 188/267 |
| 2005/0268744 A1* | 12/2005 | Embach et al. | 74/551.9 |
| 2007/0029711 A1* | 2/2007 | Ehara et al. | 267/64.28 |
| 2007/0063544 A1* | 3/2007 | Browne et al. | 296/187.09 |
| 2009/0204229 A1* | 8/2009 | Mosler et al. | 623/26 |
| 2011/0017555 A1* | 1/2011 | Battlogg et al. | 188/267.2 |
| 2011/0031075 A1* | 2/2011 | Battlogg et al. | 188/267.2 |
| 2011/0148052 A1* | 6/2011 | Quemere et al. | 280/6.15 |
| 2012/0085606 A1* | 4/2012 | Walthert et al. | 188/267.2 |
| 2012/0303193 A1* | 11/2012 | Gresser | 701/22 |
| 2013/0031762 A1* | 2/2013 | Chellew et al. | 29/426.5 |
| 2013/0068550 A1* | 3/2013 | Gale | 180/216 |
| 2014/0083093 A1* | 3/2014 | Murakami et al. | 60/459 |
| 2014/0156143 A1* | 6/2014 | Evangelou et al. | 701/37 |
| 2014/0161513 A1* | 6/2014 | Chellew et al. | 403/322.1 |
| 2014/0238795 A1* | 8/2014 | Hoult | 188/269 |

* cited by examiner

HEIGHT ADJUSTABLE DAMPING DEVICE

TECHNICAL FIELD

The invention generally relates to a damping device for a vehicle, and a method of adjusting a length of the damping device.

BACKGROUND

Vehicles use a damping device, such as a shock absorber or strut, at each corner of the vehicle. The damping devices dampen relative movement, i.e., jounce, between a wheel of the vehicle and a body of the vehicle. Typically, the damping device includes a housing that is attached to the body of the vehicle at an upper attachment end, and a rod that is attached to the wheel of the vehicle at a lower attachment end. The rod includes a piston disposed within the housing that interacts with a fluid, e.g., oil. The rod and piston are moveable along a longitudinal axis relative to the housing. Movement of the wheel relative to the body causes the rod and the piston to move within the fluid. The interaction between the piston and the fluid absorbs energy, thereby slowing or damping the relative movement therebetween.

Because the rod moves relative to the housing, the length of the damping device between the upper attachment end and the lower adjustment end varies with relative movement between the wheel and the body. However, the position of the upper attachment end and the housing typically remains constant.

SUMMARY

A damping device includes a first pressure chamber extending along a longitudinal axis, and containing a first fluid. A first rod extends along the longitudinal axis, and includes an interior end that is disposed within the first pressure chamber. The first rod is moveable along the longitudinal axis relative to the first pressure chamber. A first piston is attached to the interior end of the first rod, and interacts with the first fluid to dampen movement of the first rod along the longitudinal axis. A second pressure chamber extends along the longitudinal axis, and contains a magnetorheological fluid. A second rod extends along the longitudinal axis. A second piston is attached to the second rod, and interacts with the magnetorheological fluid. An electromagnet is disposed in magnetic contact with the magnetorheological fluid. The electromagnet is operable to apply a magnetic field to the magnetorheological fluid in response to an electric current to increase viscosity of the magnetorheological fluid. Viscosity of the magnetorheological fluid is increased to secure a position of the second piston within the second pressure chamber.

A damping device for a vehicle is also provided. The damping device includes a housing concentrically disposed about and extending along a longitudinal axis. The housing defines a pressure chamber. A magnetorheological fluid is disposed within the pressure chamber. A rod is coupled to the housing, and extends along the longitudinal axis. The rod is moveable relative to the housing to adjust a length between an attachment end of the rod and the housing. A piston is attached to the rod and disposed within the pressure chamber. The piston is immersed within the magnetorheological fluid, and separates the pressure chamber into a first half and a second half. The piston includes a fluid port in fluid communication with each of the first half and the second half of the second pressure chamber to allow the magnetorheological fluid to flow between the first half and the second half of the second pressure chamber. A magnetic source is disposed in magnetic contact with the magnetorheological fluid. The electromagnet is operable to apply a magnetic field to the magnetorheological fluid to increase viscosity of the magnetorheological fluid to prevent movement of the rod relative to the housing. The magnetorheological fluid is free to flow between the first half and the second half of the pressure chamber in the absence of the magnetic field from the magnetic source to allow adjustment of the length.

A method of adjusting a length of a damping device of a vehicle is also provided. The method includes selecting a desired length of the damping device, and determining a current length of the damping device. When the current length of the damping device is not within a pre-defined range of the desired length, an electromagnet is de-energized to allow a magnetorheological fluid to flow through a fluid port of a piston, between a first half and a second half of a pressure chamber, to allow a rod to move along a longitudinal axis. When the current length of the damping device is within the pre-defined range of the desired length, the electromagnet is energized to increase the viscosity of the magnetorheological fluid and prevent the magnetorheological fluid from flowing between the first half and the second half of the pressure chamber to secure an axial position of the rod along the longitudinal axis.

Accordingly, the electromagnet is energized to increase the viscosity of the magnetorheological fluid to a viscoelastic solid, thereby preventing movement of the magnetorheological fluid through the fluid port of the second piston immersed within the magnetorheological fluid, and securing or locking the second piston and the second rod in place. The damping device may utilize the jounce cycle of the vehicle to adjust the length of the damping device. For example, the length of the damping device may be increased by de-energizing the electromagnet while at the lower end or bottom of a jounce cycle, thereby allowing the magnetorheological fluid to flow through the fluid port of the second piston, and then energizing the electromagnet at the upper end or top of the jounce cycle, to secure the second rod in position along the longitudinal axis. Alternatively, the length of the damping device may be decreased by de-energizing the electromagnet while at the upper end or top of a jounce cycle, thereby allowing the magnetorheological fluid to flow through the fluid port of the second piston, and then energizing the electromagnet at the lower end or bottom of the jounce cycle, to secure the second rod in position along the longitudinal axis. Accordingly, the length of the damping device, and thereby the relative height between the wheel of the vehicle and the body of the vehicle, may be adjusted without the need of additional power sources, such as electric motors, hydraulic pumps, etc.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
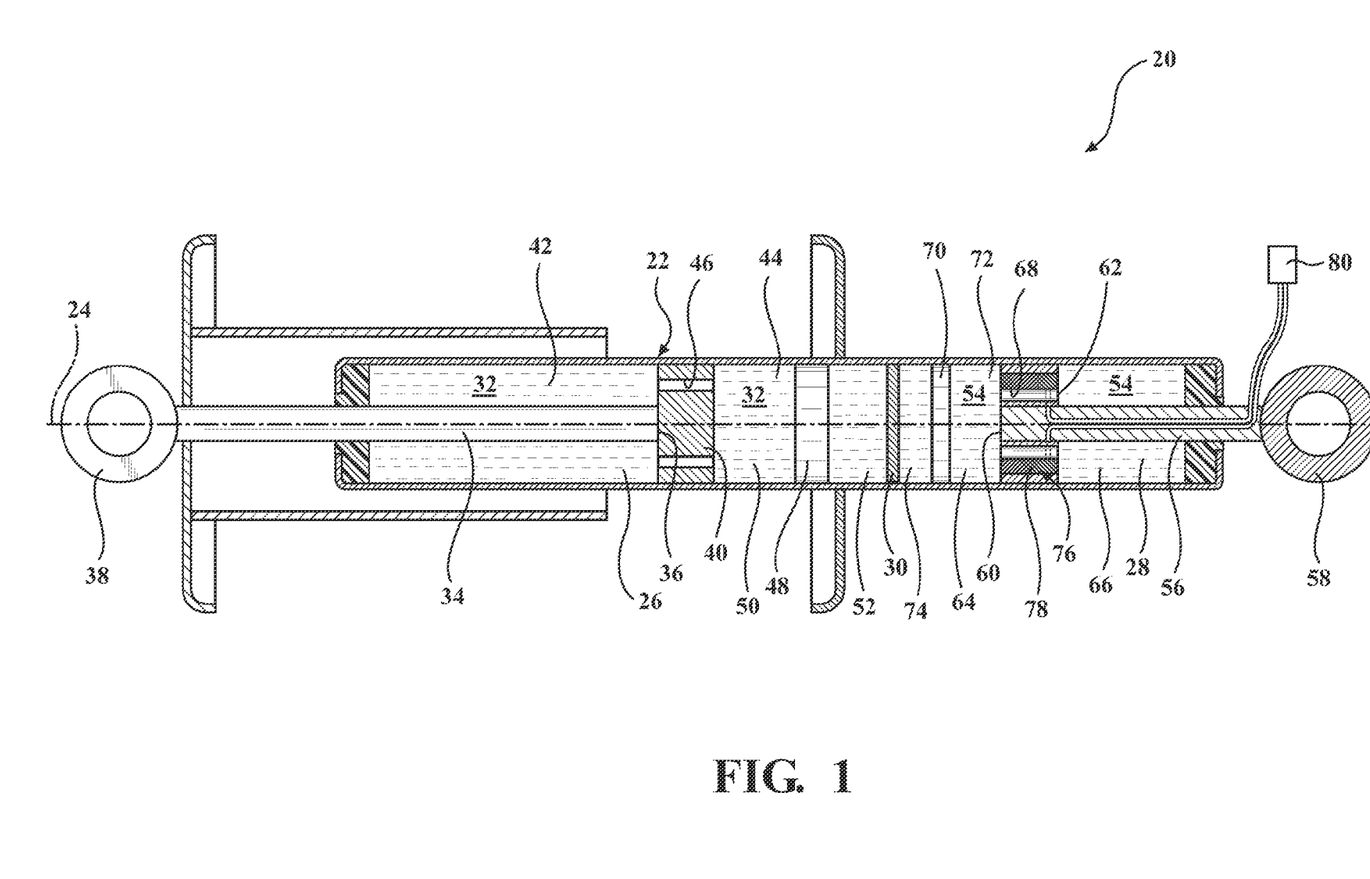
FIG. 1 is a schematic cross sectional view of a damping device for a vehicle shown in a contracted position.
Figure 2:
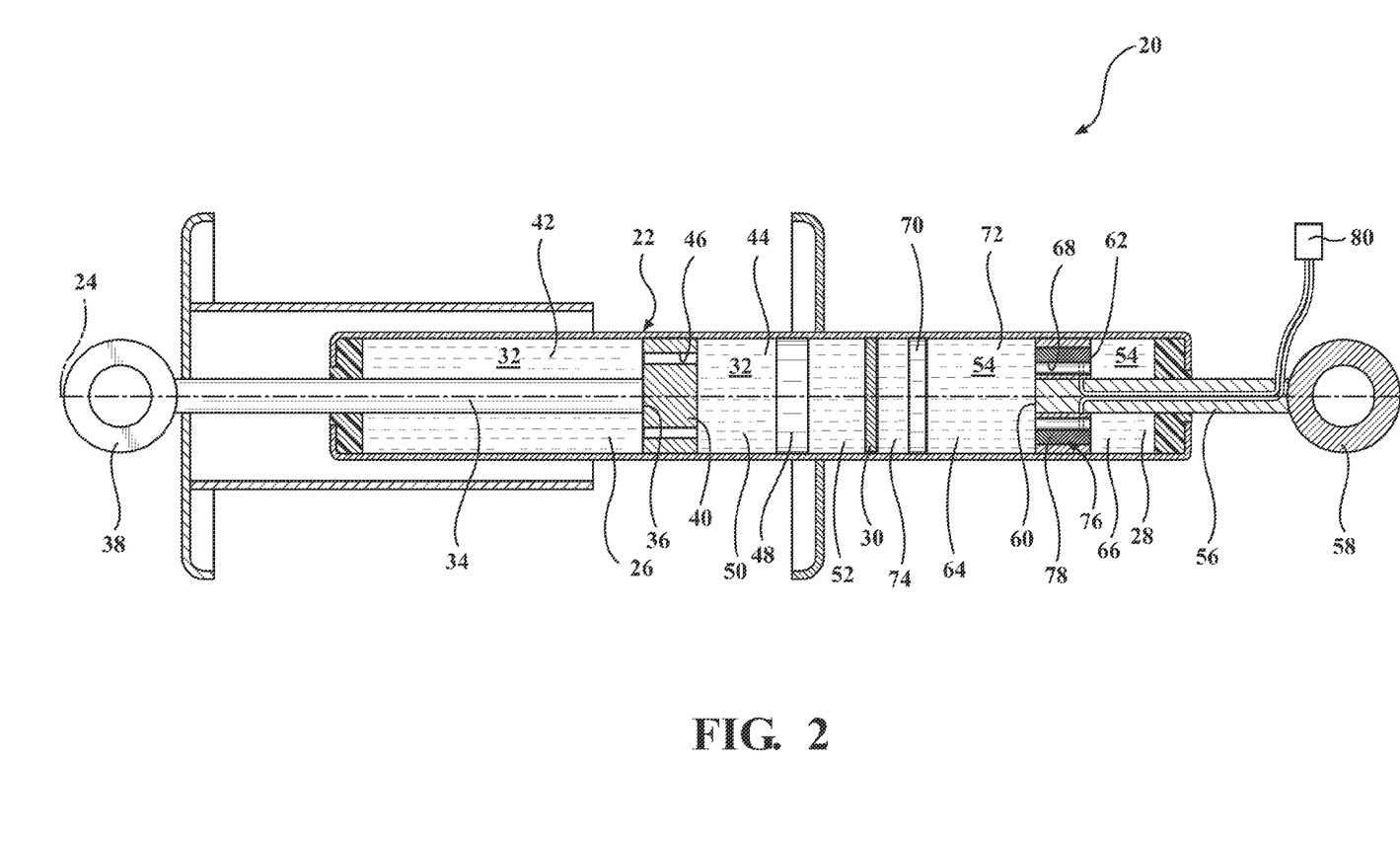
FIG. 2 is a schematic cross sectional view of the damping device shown in an extended position.

Referring to the Figures, wherein like numerals indicate like parts throughout the several views, a damping device is generally shown at 20 in FIGS. 1 and 2. The damping device 20 may be configured as, but is not limited to, a shock absorber or a suspension strut assembly for a vehicle (not shown).

Referring to FIGS. 1 and 2, the damping device 20 includes a primary housing 22 that extends along and is concentrically disposed about a longitudinal axis 24. The primary housing 22 defines a first pressure chamber 26 and a second pressure chamber 28. The first pressure chamber 26 and the second pressure chamber 28 are coaxially aligned with each other in an end-to-end orientation, and extend along the longitudinal axis 24. The first pressure chamber 26 and the second pressure chamber 28 are separated by a divider 30 that completely separates and isolates the first pressure chamber 26 from the second pressure chamber 28.

The first pressure chamber 26 contains a first fluid 32 disposed therein. The first fluid 32 may include, but is not limited to, a liquid such as an oil. However, it should be appreciated that the first fluid 32 may alternatively include a gas. The first pressure chamber 26 and the second pressure chamber 28 are separate from each other and are not in fluid communication with each other. As such, the first fluid 32 does not travel into or otherwise communicate with the second pressure chamber 28.

A first rod 34 is concentrically disposed within the first pressure chamber 26, and extends along the longitudinal axis 24. The first rod 34 includes an interior end 36 that is disposed within the first pressure chamber 26. The first rod 34 is moveable along the longitudinal axis 24 relative to the first pressure chamber 26, such that the interior end 36 of the first rod 34 moves within the first pressure chamber 26. The first rod 34 includes an exterior end 38 that is configured for attachment to a structure, such as but not limited to a wheel (not shown) of a vehicle (not shown).

A first piston 40 is attached to the interior end 36 of the first rod 34. The first piston 40 interacts with the first fluid 32 to dampen movement of the first rod 34 along the longitudinal axis 24. The first piston 40 separates the first pressure chamber 26 into a first half 42 and a second half 44. The first piston 40 includes a first fluid port 46 in fluid communication with each of the first half 42 and the second half 44 of the first pressure chamber 26. As the first piston 40 moves within the first pressure chamber 26, the first fluid 32 moves through the first fluid port 46, between the first half 42 and the second half 44 of the first pressure chamber 26, to equalize pressure in each of the first half 42 and the second half 44 of the first pressure chamber 26. The first fluid port 46 restricts movement of the first fluid 32 between the first half 42 and the second half 44 of the first pressure chamber 26, thereby restricting movement of the first piston 40, and damping movement of the first rod 34 relative to the primary housing 22.

A first floating piston 48 is disposed within the first pressure chamber 26, in one of the first half 42 or the second half 44 of the first pressure chamber 26. The first floating piston 48 separates one of the first half 42 or the second half 44 of the first pressure chamber 26 into a first fluid chamber 50 containing the first fluid 32 and a first gas chamber 52 containing a gas, such as but not limited to nitrogen gas. Accordingly, if the first floating piston 48 is disposed in the first half 42 of the first pressure chamber 26, then the first floating piston 48 separates the first half 42 of the first pressure chamber 26 into the first fluid chamber 50 and the first gas chamber 52. Alternatively, and as shown in FIGS. 1 and 2, if the first floating piston 48 is disposed in the second half 44 of the first pressure chamber 26, then the first floating piston 48 separates the second half 44 of the first pressure chamber 26 into the first fluid chamber 50 and the first gas chamber 52.

The second pressure chamber 28 contains a magnetorheological fluid 54. When subjected to a magnetic field, the magnetorheological fluid greatly increases its apparent viscosity, to the point of becoming a viscoelastic solid. Preferably, the magnetorheological fluid 54 includes iron particles. In contrast, the first fluid 32 does not include iron particles.

The damping device 20 includes a second rod 56 that extends along the longitudinal axis 24. The second rod 56 includes an attachment end 58 that is disposed outside of the second pressure chamber 28. The attachment end 58 is configured for attachment to a structure, such as but not limited to a body of the vehicle. The second rod 56 includes an interior end 60 that is disposed within the second pressure chamber 28. A second piston 62 is attached to the interior end 60 of the second rod 56. The second piston 62 interacts with the magnetorheological fluid 54. The second rod 56 is moveable along the longitudinal axis 24 relative to the primary housing 22 and the second pressure chamber 28, such that the second piston 62 is moveable within the second pressure chamber 28.

The second piston 62 separates the second pressure chamber 28 into a first half 64 and a second half 66. The second piston 62 includes a second fluid port 68 in fluid communication with each of the first half 64 and the second half 66 of the second pressure chamber 28. The second piston 62 is immersed within the magnetorheological fluid 54. As the second piston 62 moves within the second pressure chamber 28, the magnetorheological fluid moves through the second fluid port 68, between the first half 64 and the second half 66 of the second pressure chamber 28, to equalize pressure in each of the first half 64 and the second half 66 of the second pressure chamber 28.

A second floating piston 70 is disposed within the second pressure chamber 28, in one of the first half 64 or the second half 66 of the second pressure chamber 28. The second floating piston 70 separates one of the first half 64 or the second half 66 of the second pressure chamber 28 into a second fluid chamber 72 containing the magnetorheological fluid and a second gas chamber 74 containing a gas, such as but not limited to nitrogen gas. Accordingly, and as shown in FIGS. 1 and 2, if the second floating piston 70 is disposed in the first half 64 of the second pressure chamber 28, then the second floating piston 70 separates the first half 64 of the second pressure chamber 28 into the second fluid chamber 72 and the second gas chamber 74. Alternatively, if the second floating piston 70 is disposed in the second half 66 of the second pressure chamber 28, then the second floating piston 70 separates the second half 66 of the second pressure chamber 28 into the second fluid chamber 72 and the second gas chamber 74.

The second rod 56 is moveable relative to the primary housing 22 to adjust a length of the damping device 20. More specifically, the second rod 56 is moveable relative to the primary housing 22 to adjust the length between the attachment end 58 of the second rod 56 and the primary housing 22. As such, the adjustable length of the damping device 20 is the length between the attachment end 58 of the second rod 56 and the primary housing 22, and is not the length between the exterior end 38 of the first rod 34 and the attachment end 58 of the second rod 56.

The damping device 20 includes a magnetic source 76 operable to apply a magnetic field to the magnetorheological fluid 54. Preferably, the magnetic source 76 includes, but is not limited to, an electromagnet 78. The electromagnet 78 is disposed in magnetic contact with the magnetorheological fluid 54. The electromagnet 78 is operable to apply a magnetic field to the magnetorheological fluid 54 in response to an electric current. The magnetorheological fluid increases viscosity in response to the applied magnetic field to secure a position of the second piston 62 within the second pressure chamber 28. As noted above, the electromagnet 78 is operable to increase the viscosity of the magnetorheological fluid 54 to a viscoelastic solid in response to the electric current.

The magnetorheological fluid 54 may flow through the second fluid port 68 of the second piston 62, between the first half 64 and the second half 66 of the second pressure chamber 28, in the absence of the magnetic field from the electromagnet 78. In response to an applied magnetic field, the viscosity of the magnetorheological fluid increases, which prevents the magnetorheological fluid from flowing through the second fluid port 68, between the first half 64 and the second half 66 of the second pressure chamber 28, which substantially prevents movement of the second piston 62 within the second pressure chamber 28, thereby securing the position of the second rod 56 relative to the primary housing 22 and defining the length of the damping device 20.

As shown in FIGS. 1 and 2, the electromagnet 78 is disposed within the second pressure chamber 28, and is attached to and moveable with the second piston 62 within the second pressure chamber 28. However, it should be appreciated that the electromagnet 78 may be positioned in some other relative location that allows the electromagnet 78 to apply the magnetic field to the magnetorheological fluid.

An electronic control unit 80 is coupled to the electromagnet 78, and is operable to control the electric current applied to the electromagnet 78. The electronic control unit 80 includes all hardware, software, sensors, connections, communication, etc., necessary to control the current applied to the electromagnet 78. The electronic control unit 80 is operable to control the energizing and de-energizing of the electromagnet 78 to achieve a desired axial position of the second piston 62 along the longitudinal axis 24. More specifically, the electronic control unit 80 is operable to de-energize the electromagnet 78 to allow the magnetorheological fluid 54 to flow between the first half 64 and the second half 66 of the second pressure chamber 28, and is also operable to energize the electromagnet 78 to prevent the magnetorheological fluid 54 from flowing between the first half 64 and the second half 66 of the second pressure chamber 28.

A method of adjusting the length of the damping device 20 is also provided. The method includes sensing a current length of the damping device 20. The current length of the damping device 20 may be sensed and/or determined in any suitable manner, such as by one or more sensors that directly monitor the length of the damping device 20, or by position sensors that monitor a relative position between the wheel and the body of the vehicle, and then calculate the current length of the damping device 20. The electronic control unit 80 may also sense a change in the position of the wheel of the vehicle relative to a position of the body of the vehicle, over time, in order to calculate a change in the height of the vehicle, and thereby a change in the current length of the damping device 20. The electronic control unit 80 may also sense a speed of the vehicle, and an acceleration of the body of the vehicle, i.e., yaw, pitch and/or roll.

A desired length of the damping device 20 is then selected. The desired length may be selected based upon one or more factors, such as but not limited to the speed of the vehicle, the current height of the vehicle, and/or the acceleration of the body of the vehicle. For example, the length of the damping device 20 may be decreased when the vehicle speed is greater than a pre-defined speed limit, the acceleration of the body is less than a pre-defined acceleration limit, and/or the current length of the damping device 20 is greater than a pre-defined length. Alternatively, the length of the damping device 20 may be increased when the vehicle speed is less than the pre-defined speed limit, the acceleration of the body is greater than a pre-defined acceleration limit, and/or the current length of the damping device 20 is less than the pre-defined length. The pre-defined speed limit may include any speed of the vehicle, but is preferably defined at a higher speed that would require better vehicular performance. For example, the pre-defined speed limit may be defined at or near 50 mph. The pre-defined acceleration limit may include any acceleration of the body, but is preferably defined at a higher acceleration rate that requires better vehicular handling. The current length of the damping device 20 may be defined as any length within an adjustable range of the damping device 20.

The current length of the damping device 20 must be measured or determined so that the electronic control unit 80 may calculate whether the damping device 20 should be lengthened or shortened to achieve the desired length, and also to determine how much adjustment is required to achieve the desired length.

When the current length of the damping device 20 is not within a pre-defined range of the desired length, then the electronic control unit 80 may de-energize the electromagnet 78 to allow the magnetorheological fluid 54 to flow through the second fluid port 68 of the second piston 62, between the first half 64 and the second half 66 of the second pressure chamber 28, to allow the second rod 56 to move along the longitudinal axis 24. For example, the electronic control unit 80 may de-energizing the electromagnet 78 to adjust the length of the damping device 20 when the change in the position of the wheel relative to the position of the body over time is greater than the pre-defined position limit, the speed of the vehicle is greater than the pre-defined speed limit, and the acceleration of the body is less than the pre-defined acceleration limit.

When the current length of the damping device 20 is within the pre-defined range of the desired length, then the electronic control unit 80 may energize the electromagnet 78 to increase the viscosity of the magnetorheological fluid 54 and prevent the magnetorheological fluid 54 from flowing between the first half 64 and the second half 66 of the second pressure chamber 28, to secure an axial position of the second rod 56 along the longitudinal axis 24. For example, the electronic control unit 80 may energize the electromagnet 78 to prevent adjustment of the damping device 20 when the change in the position of the wheel relative to the position of the body over time is less than the pre-defined position limit, the speed of the vehicle is less than the pre-defined speed limit, or the acceleration of the body is greater than the pre-defined acceleration limit.

The electronic control unit 80 may use the jounce, i.e., bounce, of the vehicle to move the second rod 56 along the longitudinal axis 24, while the electromagnet 78 is de-energized, to adjust the length of the damping device 20. By using the jounce of the vehicle to adjust the length of the damping device 20, no external power sources are required to lift and/or lower the vehicle in order to change the length of the damping device 20. In order to use the jounce of the vehicle to adjust the length of the damping device 20, the electronic control unit 80 must measure the height of the vehicle and determine when the vehicle is at the top of the jounce cycle, i.e., at a high point, and when the vehicle is at the bottom of the jounce cycle, i.e., at a low point.

In order to decrease the length of the damping device 20, the electronic control unit 80 de-energizes the electromagnet 78 when the vehicle is at the top of the jounce cycle, thereby allowing the second rod 56 to move relative to the primary housing 22 to decrease the length of the damping device 20 as the vehicle moves down or lowers in the jounce cycle. The electronic control unit 80 energizes the electromagnet 78 to secure the position of the second rod 56 relative to the primary housing 22 when the length of the damping device 20 has decreased to the desired length.

In order to increase the length of the damping device 20, the electronic control unit 80 de-energizes the electromagnet 78 when the vehicle is at the bottom of the jounce cycle, thereby allowing the second rod 56 to move relative to the primary housing 22 to increase the length of the damping device 20 as the vehicle moves up or rises in the jounce cycle. The electronic control unit 80 energizes the electromagnet 78 to secure the position of the second rod 56 relative to the primary housing 22 when the length of the damping device 20 has increased to the desired length.

Because the vehicle may not increase the length of the damping device 20 to the desired length with every jounce cycle, the length of the damping device 20 may need to be increased iteratively, i.e., incrementally to achieve the desired length. Accordingly, the length of the damping device 20 would increase by a portion of the desired length with each jounce cycle, until the desired length of the damping device 20 is achieved.

Figure 3:
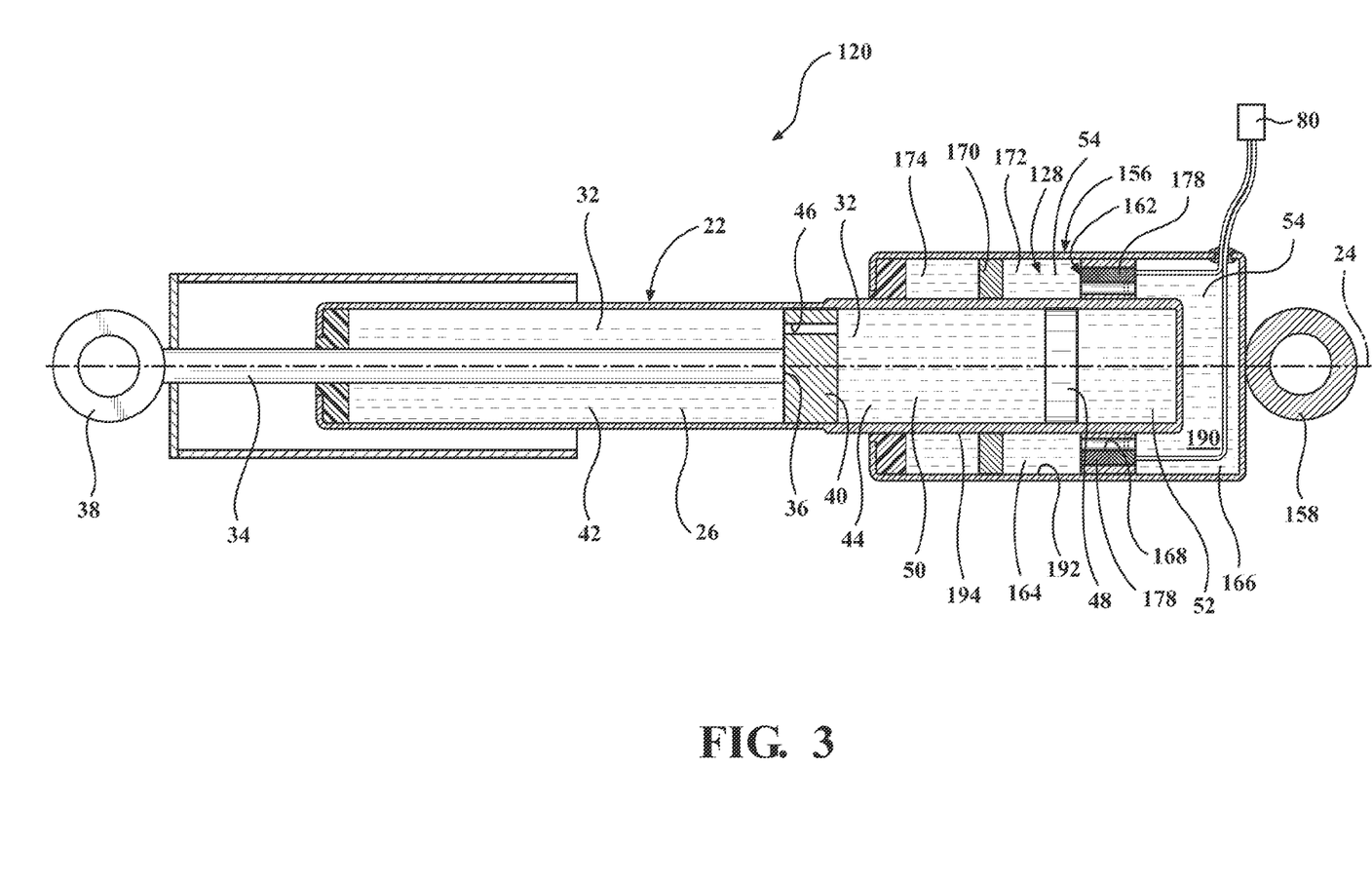
FIG. 3 is a schematic cross sectional view of an alternative embodiment of the damping device shown in the contracted position.
Figure 4:
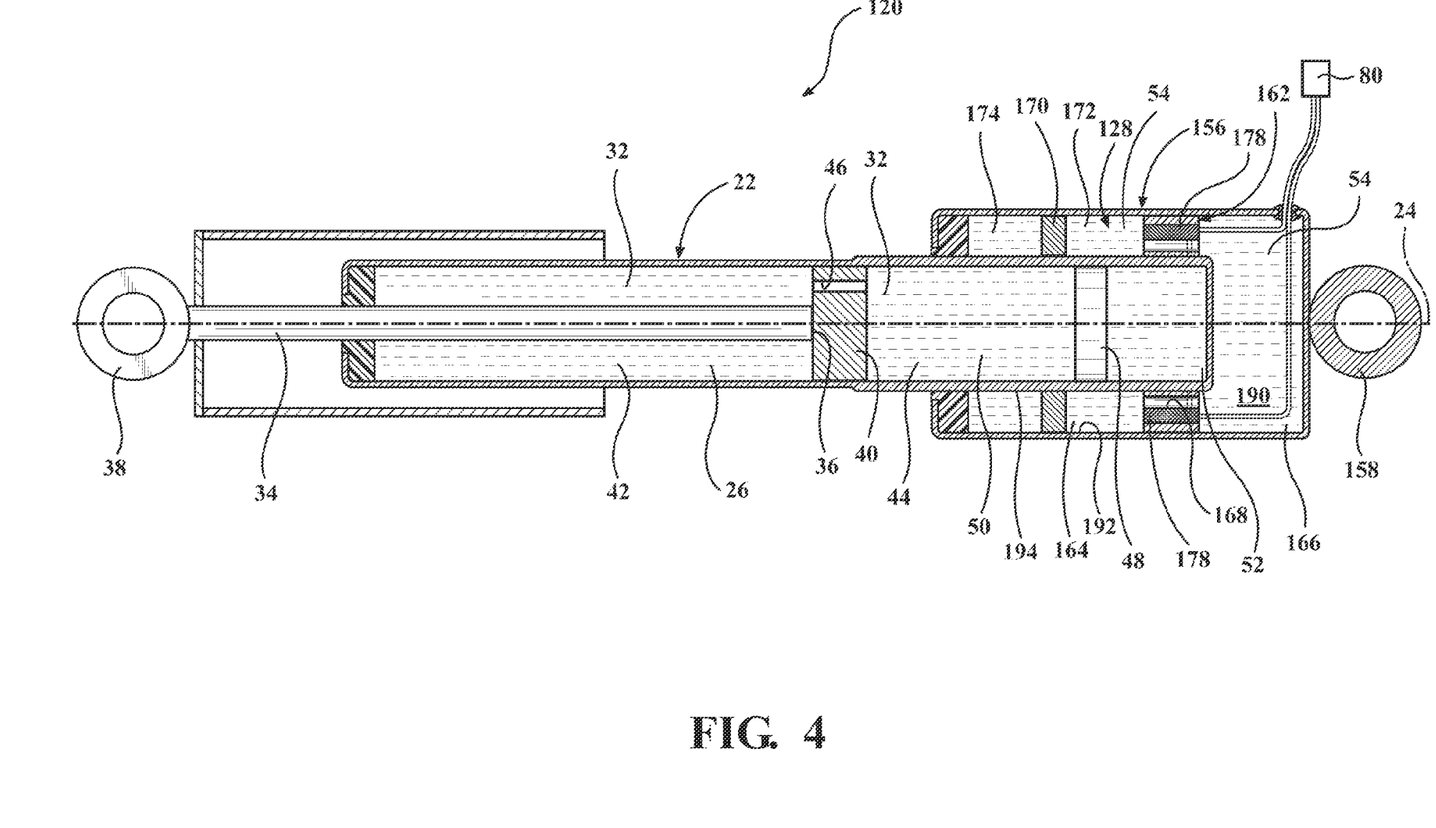
FIG. 4 is a schematic cross sectional view of the alternative embodiment of the damping device shown in the extended position.

Referring to FIGS. 3 and 4, an alternative embodiment of the damping device is generally shown at 120. The alternative embodiment of the damping device 120 shown in FIGS. 3 and 4 operates in the same manner as the damping device 20 shown in FIGS. 1 and 2, but is structured differently to provide a more axially compact device. Elements of the damping device 20 that are identical to the alternative embodiment of the damping device 120 shown in FIGS. 3 and 4, are identified with the same reference numerals used in FIGS. 1 and 2, and are not specifically described in detail below.

The alternative embodiment of the damping device 120 includes a second rod, hereinafter referred to as a secondary housing 156, that extends along the longitudinal axis 24, and is concentrically located about the primary housing 22. The secondary housing 156 includes and/or defines a hollow, interior region 190. The interior region 190 of the secondary housing 156 defines and/or forms a second pressure chamber 128. A second piston 162 is attached to the primary housing 22, and engages an inner surface 192 of the interior region 190 of the secondary housing 156. The secondary housing 156 is moveable relative to and over the second piston 162, along the longitudinal axis 24. The secondary housing 156 is disposed radially outside of an exterior surface 194 of the primary housing 22, relative to the longitudinal axis 24. The secondary housing 156 is moveable relative to the primary housing 22. As such, the secondary housing 156 moves over and relative to the exterior surface 194 of the primary housing 22, along the longitudinal axis 24. The magnetorheological fluid 54 is disposed within the interior region 190 of the secondary housing 156.

The second piston 162 separates the second pressure chamber 128 into a first half 164 and a second half 166. The second piston 162 includes a second fluid port 168 in fluid communication with each of the first half 164 and the second half 166 of the second pressure chamber 128. The second piston 162 is immersed within the magnetorheological fluid 54. As the second piston 162 moves within the second pressure chamber 128, the magnetorheological fluid 54 moves through the second fluid port 168, between the first half 164 and the second half 166 of the second pressure chamber 128, to equalize pressure in each of the first half 164 and the second half 166 of the second pressure chamber 128.

A second floating piston 170 is disposed within the second pressure chamber 128, in one of the first half 164 or the second half 166 of the second pressure chamber 128. The second floating piston 170 separates one of the first half 164 or the second half 166 of the second pressure chamber 128 into a second fluid chamber 172 containing the magnetorheological fluid 54 and a second gas chamber 174 containing nitrogen gas. Accordingly, and as shown in FIGS. 3 and 4, if the second floating piston 170 is disposed in the first half 164 of the second pressure chamber 128, then the second floating piston 170 separates the first half 164 of the second pressure chamber 128 into the second fluid chamber 172 and the second gas chamber 174. Alternatively, if the second floating piston 170 is disposed in the second half 166 of the second pressure chamber 128, then the second floating piston 170 separates the second half 166 of the second pressure chamber 128 into the second fluid chamber 172 and the second gas chamber 174.

The secondary housing 156 is moveable relative to the primary housing 22 to adjust a length of the damping device 120. More specifically, the secondary housing 156 is moveable relative to the primary housing 22 to adjust the length between an attachment end 158 of the secondary housing 156 and the primary housing 22. As such, the adjustable length of the damping device 120 is the length between the attachment end 158 of the secondary housing 156 and the primary housing 22, and is not the length between the exterior end 38 of the first rod 34 and the attachment end 158 of the secondary housing 156.

As shown in FIGS. 3 and 4, an electromagnet 178 is disposed within the second pressure chamber 128, and is attached to the second piston 162 within the second pressure chamber 128. However, it should be appreciated that the electromagnet 178 may be positioned in some other relative location that allows the electromagnet 178 to apply the magnetic field to the magnetorheological fluid 54.

The magnetorheological fluid 54 may flow through the second fluid port 168 of the second piston 162, between the first half 164 and the second half 166 of the second pressure chamber 128, in the absence of the magnetic field from the electromagnet 178. In response to an applied magnetic field, the viscosity of the magnetorheological fluid 54 increases, which prevents the magnetorheological fluid 54 from flowing through the second fluid port 168, between the first half 164 and the second half 166 of the second pressure chamber 128, which substantially prevents movement of the second piston 162 within the second pressure chamber 128, thereby securing the position of the secondary housing 156 relative to the primary housing 22 and defining the length of the damping device 120.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A damping device comprising:
   a first pressure chamber extending along a longitudinal axis and containing a first fluid;
   a first rod extending along the longitudinal axis and including an interior end disposed within the first pressure chamber, wherein the first rod is moveable along the longitudinal axis relative to the first pressure chamber;
   a first piston attached to the interior end of the first rod and interacting with the first fluid to dampen movement of the first rod along the longitudinal axis;
   a second pressure chamber extending along the longitudinal axis and containing a magnetorheological fluid;
   a second rod extending along the longitudinal axis;
   a second piston attached to the second rod and interacting with the magnetorheological fluid;
   an electromagnet disposed in magnetic contact with the magnetorheological fluid, and operable to apply a magnetic field to the magnetorheological fluid in response to an electric current to increase viscosity of the magnetorheological fluid to secure a position of the second piston within the second pressure chamber.

2. The damping device set forth in claim 1 wherein the first pressure chamber and the second pressure chamber are separate from each other and are not in fluid communication with each other.

3. The damping device set forth in claim 1 wherein the electromagnet is disposed within the second pressure chamber.

4. The damping device set forth in claim 1 wherein the electromagnet is attached to and moveable with the second piston within the second pressure chamber.

5. The damping device set forth in claim 1 wherein the magnetorheological fluid includes iron particles, and wherein the first fluid does not include iron particles.

6. The damping device set forth in claim 1 wherein the second piston separates the second pressure chamber into a first half and a second half, and includes a fluid port in fluid communication with each of the first half and the second half of the second pressure chamber to allow the magnetorheological fluid to flow between the first half and the second half of the second pressure chamber in the absence of the magnetic field from the electromagnet.

7. The damping device set forth in claim 6 further comprising a second floating piston disposed within the second pressure chamber, in one of the first half or the second half of the second pressure chamber, to separate one of the first half or the second half of the second pressure chamber into a fluid chamber containing the magnetorheological fluid and a gas chamber containing a nitrogen gas.

8. The damping device set forth in claim 1 further comprising an electronic control unit coupled to the electromagnet and operable to control the electric current to the electromagnet, wherein the electronic control unit includes all hardware and software necessary to:
   de-energize the electromagnet to allow the magnetorheological fluid to flow between the first half and the second half of the second pressure chamber;
   energize the electromagnet to prevent the magnetorheological fluid from flowing between the first half and the second half of the second pressure chamber; and
   control the energizing and de-energizing of the electromagnet to achieve a desired axial position of the second piston along the longitudinal axis.

9. The damping device set forth in claim 1 further comprising a primary housing defining the first pressure chamber.

10. The damping device set forth in claim 9 wherein the primary housing defines the second pressure chamber, with the first pressure chamber and the second pressure chamber coaxially aligned with each other in an end-to-end orientation along the longitudinal axis.

11. The damping device set forth in claim 10 wherein the second rod includes an interior end disposed within the second pressure chamber, with the second piston attached to the interior end of the second rod, and wherein the second rod is moveable along the longitudinal axis relative to the second pressure chamber.

12. The damping device set forth in claim 9 wherein the second rod includes an interior region defining the second pressure chamber, with the second piston and the magnetorheological fluid disposed within the interior region of the second rod.

13. The damping device set forth in claim 12 wherein the second rod is disposed radially outside of an exterior surface of the primary housing relative to the longitudinal axis, and wherein the second rod is moveable relative to the primary housing.

* * * * *